(12) United States Patent
Wen et al.

(10) Patent No.: US 12,503,152 B2
(45) Date of Patent: Dec. 23, 2025

(54) DEVICE FOR CONCEALING STEERING WHEEL AND VEHICLE

(71) Applicant: AutoX, Inc., Grand Cayman (KY)

(72) Inventors: Liang Wen, Guangdong (CN); Hailin Xiong, Guangdong (CN)

(73) Assignee: AutoX, Inc., Grand Cayman (KY)

(*) Notice: Subject to any disclaimer, the term of this patent is extended or adjusted under 35 U.S.C. 154(b) by 0 days.

(21) Appl. No.: 18/890,780

(22) Filed: Sep. 20, 2024

(65) Prior Publication Data

US 2025/0091636 A1 Mar. 20, 2025

(30) Foreign Application Priority Data

Sep. 20, 2023 (CN) .......................... 202311220057.8

(51) Int. Cl.
 B62D 1/183 (2006.01)

(52) U.S. Cl.
 CPC .................................. B62D 1/183 (2013.01)

(58) Field of Classification Search
 CPC ..................................................... B62D 1/183
 See application file for complete search history.

(56) References Cited

U.S. PATENT DOCUMENTS

| | | | | |
|---|---|---|---|---|
| 11,667,324 | B2* | 6/2023 | Ahn | B62D 1/18 |
| | | | | 180/326 |
| 2004/0016588 | A1* | 1/2004 | Vitale | B62D 1/18 |
| | | | | 180/322 |
| 2005/0283288 | A1* | 12/2005 | Howell | B62D 1/18 |
| | | | | 701/41 |
| 2017/0341678 | A1* | 11/2017 | Dekker | B62D 1/04 |
| 2022/0135112 | A1* | 5/2022 | Harmon | B60K 35/50 |
| | | | | 180/334 |
| 2024/0025322 | A1* | 1/2024 | Salter | B62D 25/14 |

FOREIGN PATENT DOCUMENTS

| | | | | |
|---|---|---|---|---|
| CN | 111717268 A | * | 9/2020 | B60K 26/02 |
| CN | 117944752 A | * | 4/2024 | B62D 1/12 |
| DE | 102019106545 A1 | * | 9/2020 | |
| DE | 102019112875 A1 | * | 11/2020 | |
| WO | WO-2024257773 A1 | * | 12/2024 | |

* cited by examiner

*Primary Examiner* — Drew J Brown
(74) *Attorney, Agent, or Firm* — Zhigang Ma

(57) ABSTRACT

A device for concealing the steering wheel provided includes provided includes a slide mechanism, and a display. The slide mechanism is installed in a length direction of the center console. The steering wheel is located between the slide mechanism and the center console, the steering wheel is close to an end of the slide mechanism. The slide mechanism includes a slide base, and a slidable assembly. The slidable assembly moves reciprocally along the slide base. The display is fixed to the slidable assembly. The display is driven by the slidable assembly to be switched between a first position and a second position. The display is separated from the steering wheel when the display being located at the first positions. The display shields a side of the steering wheel away from the center console when the display being located at the second position.

20 Claims, 4 Drawing Sheets

DEVICE FOR CONCEALING STEERING WHEEL AND VEHICLE

TECHNICAL FIELD

The disclosure relates to autonomous driving technologies, in particular to a device for concealing a steering wheel and vehicle.

BACKGROUND

With a rapid development of vehicles, functions of vehicles have become increasingly perfect, especially autonomous driving, which has largely reduced driving works of drivers. Since operating frequency of a steering wheel will be significantly reduced when a vehicle is in autonomous driving, the steering wheel can be accommodated during autonomous driving. However, the steering wheel accommodated is not shielded when the vehicle is in autonomous driving, Therefore, the steering wheel limits an entertainment space for a driver and affects aesthetics of a cab of the vehicle.

SUMMARY

A device for concealing a steering wheel and vehicle provided reasonably utilize a space of the steering wheel, so as to realize expansion of an entertainment space for a driver, and aesthetics of a cab of the vehicle.

In a first aspect, the device for concealing the steering wheel for the steering wheel is provided. The steering wheel is retractablly installed in a center console of a vehicle to be out of the center console or embedded in the center console. The device for concealing the steering wheel includes a slide mechanism, and a display. The slide mechanism is installed in a length direction of the center console. The steering wheel is located between the slide mechanism and the center console. The steering wheel is close to an end of the slide mechanism. The slide mechanism include a slide base, and a slidable assembly. The slidable assembly moves reciprocally along the slide base. The display is fixed to the slidable assembly. The display is driven by the slidable assembly to be switched between a first position and a second position. The display is separated from the steering wheel when the display being located at the first position. The display shields a side of the steering wheel away from the center console when the display being located at the second position.

In a second aspect, the vehicle provided includes the center console, the steering wheel, and the device for concealing the steering wheel. The steering wheel is retractablly installed in the center console of the vehicle to be out of the center console or embedded in the center console. The device for concealing the steering wheel includes the slide mechanism, and the display. The slide mechanism is installed in the length direction of the center console. The steering wheel is located between the slide mechanism and the center console. The steering wheel is close to the end of the slide mechanism. The slide mechanism includes the slide base, and the slidable assembly. The slidable assembly moves reciprocally along the slide base. The display is fixed to the slidable assembly. The display is driven by the slidable assembly to be switched between the first position and the second position. The display is separated from the steering wheel when the display being located at the first position. The display shields the side of the steering wheel away from the center console when the display being located at the second position.

In the present invention, by means of the display and the slide mechanism provided in the central console of the vehicle, the display shields the steering wheel, so that the space of the steering wheel is reasonably utilized, thereby realizing expansion of the entertainment space for the driver, and aesthetics of the cab of the vehicle.

BRIEF DESCRIPTION OF THE DRAWINGS

In order to illustrate the technical solution in the embodiments of the disclosure or the prior art more clearly, a brief description of drawings required in the embodiments or the prior art is given below. Obviously, the drawings described below are only some of the embodiments of the disclosure. For ordinary technicians in this field, other drawings can be obtained according to the structures shown in these drawings without any creative effort.

Reference number in the figures: 10. steering wheel; 11. display; 121. slide rail; 1211. bearing; 122. base; 131. first connecting portion; 132. second connecting portion; 133. fitting portion; 141. guide groove; 142. chain; 151. motor; 1521. screw; 1522. screw-nut; 16. clash-proof block.

DETAILED DESCRIPTION OF THE EMBODIMENTS

In order to make the purpose, technical solution and advantages of the disclosure more clearly, the disclosure is further described in detail in combination with the drawings and embodiments. It is understood that the specific embodiments described herein are used only to explain the disclosure and are not configured to define it. On the basis of the embodiments in the disclosure, all other embodiments obtained by ordinary technicians in this field without any creative effort are covered by the protection of the disclosure.

The terms "first", "second", "third", "fourth", if any, in the specification, claims and drawings of this application are configured to distinguish similar objects but need not be configured to describe any particular order or sequence of priorities. It should be understood that the data used here are interchangeable where appropriate, in other words, the embodiments described can be implemented in order other than what is illustrated or described here. In addition, the terms "include" and "have" and any variation of them, can encompass other things. For example, processes, methods, systems, products, or equipment that comprise a series of steps or units need not be limited to those clearly listed, but may include other steps or units that are not clearly listed or are inherent to these processes, methods, systems, products, or equipment.

It is to be noted that the references to "first", "second", etc. in the disclosure are for descriptive purpose only and neither be construed or implied the relative importance nor indicated as implying the number of technical features. Thus, feature defined as "first" or "second" can explicitly or implicitly include one or more such features. In addition, technical solutions between embodiments may be integrated, but only on the basis that they can be implemented by ordinary technicians in this field. When the combination of technical solutions is contradictory or impossible to be realized, such combination of technical solutions shall be deemed to be non-existent and not within the scope of protection required by the disclosure.

Figure 1:
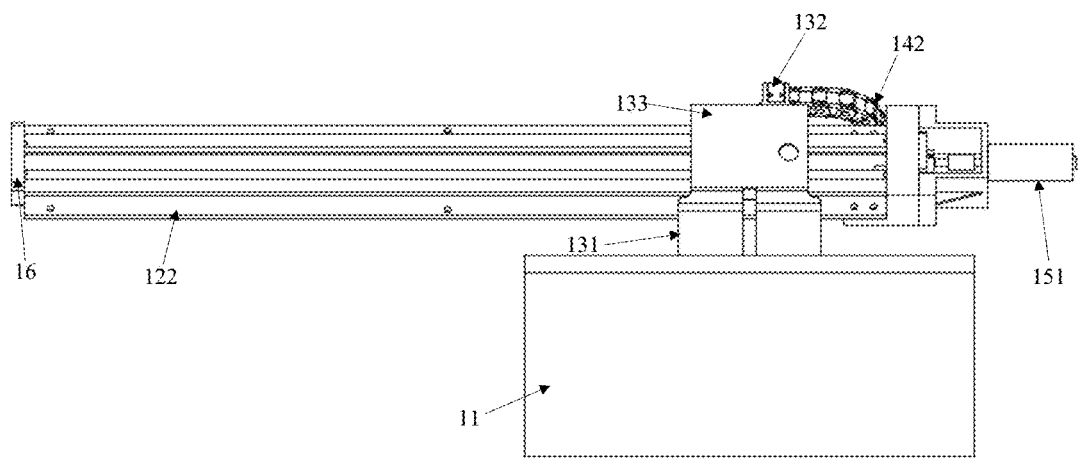
FIG. 1 illustrates a main view of a first position of a device for concealing a steering wheel.
Figure 2:
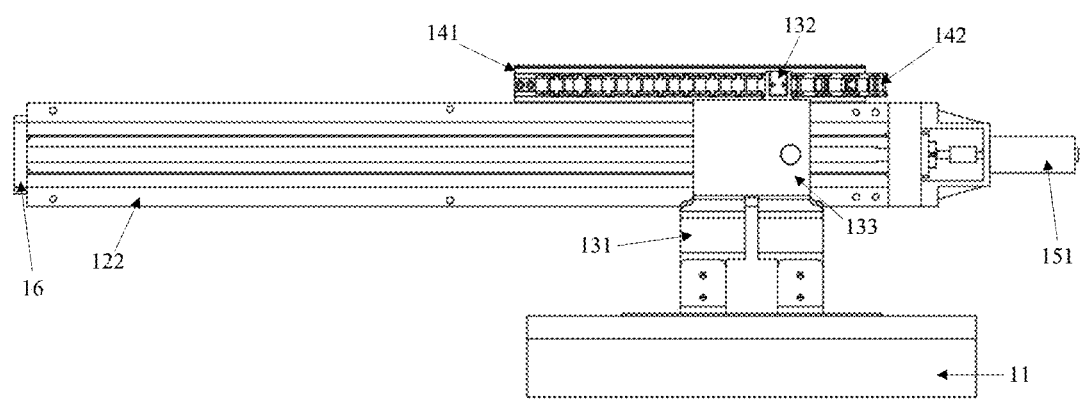
FIG. 2 illustrates a vertical view of a first position of a device for concealing a steering wheel.
Figure 3:
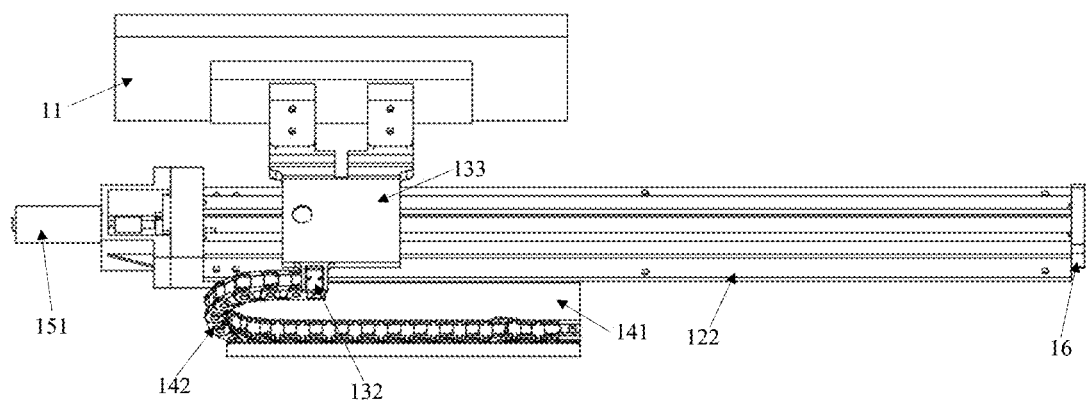
FIG. 3 illustrates a schematic diagram of a first position of a connection of a chain.
Figure 4:
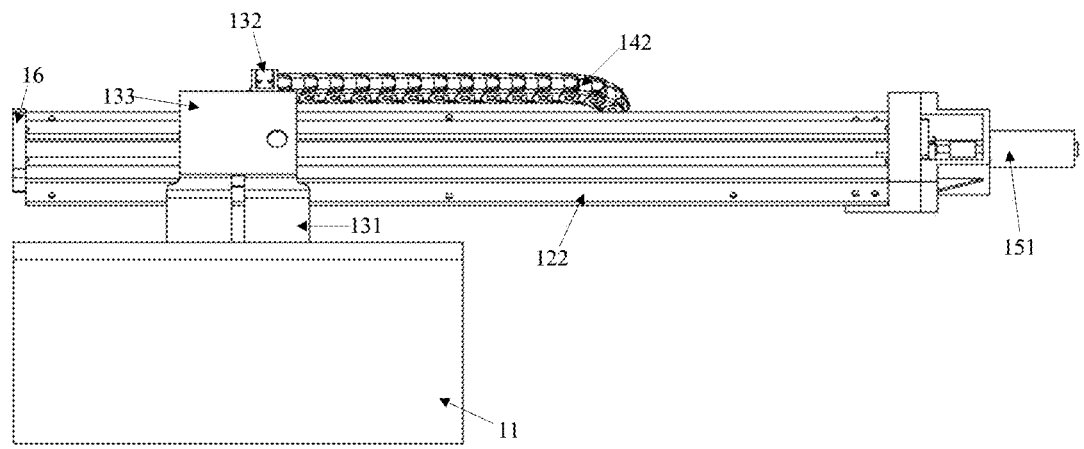
FIG. 4 illustrates a main view of a second position of a device for concealing a steering wheel.
Figure 5:
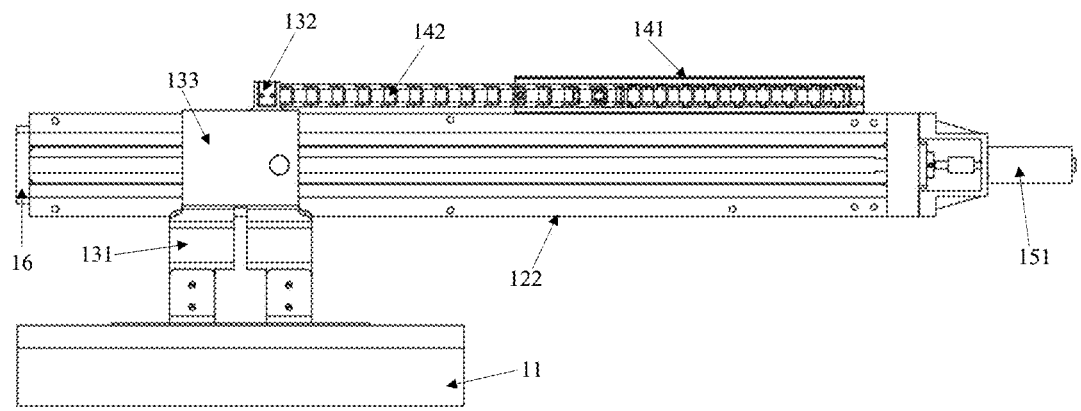
FIG. 5 illustrates a vertical view of a second position of a device for concealing a steering wheel.
Figure 6:
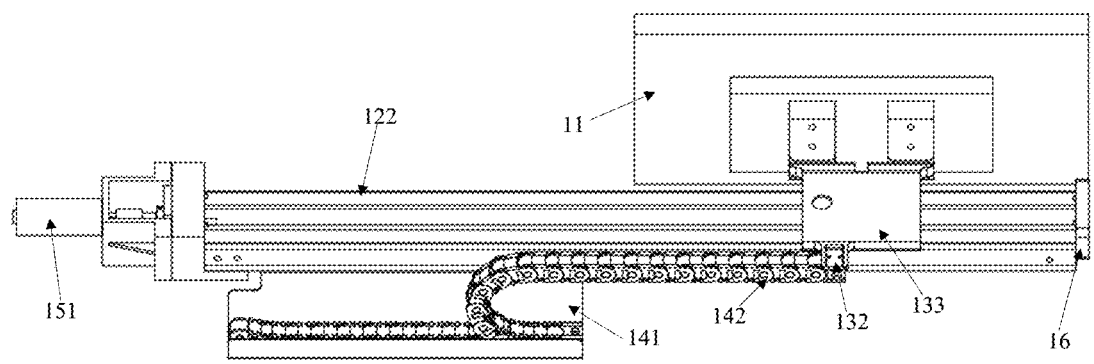
FIG. 6 illustrates a schematic diagram of a second position of a connection of a chain.
Figure 7:
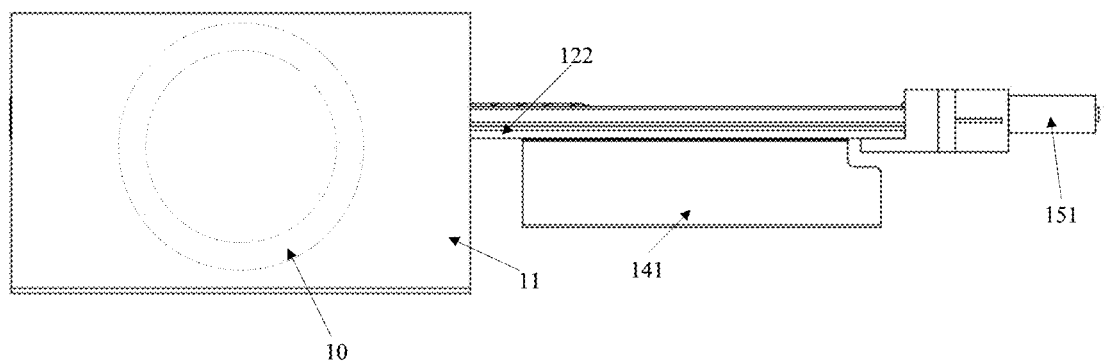
FIG. 7 illustrates a perspective view of a second position of a steering wheel.
Figure 8:
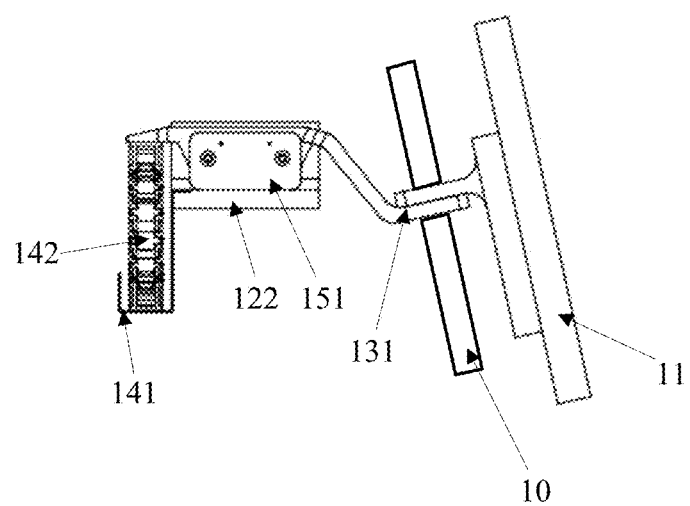
FIG. 8 illustrates a left view of a second position of a steering wheel.
Figure 9:
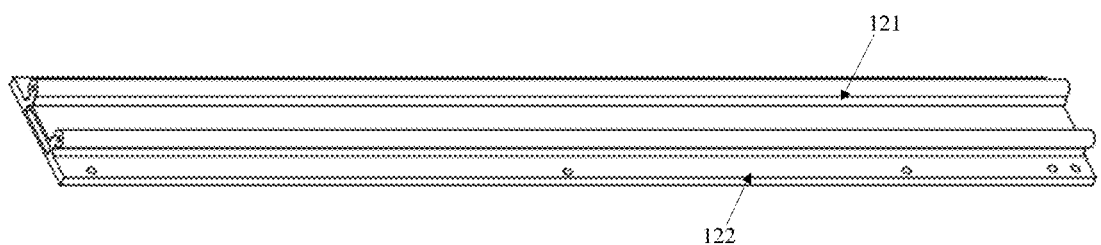
FIG. 9 illustrates a structure diagram of a slide base.
Figure 10:
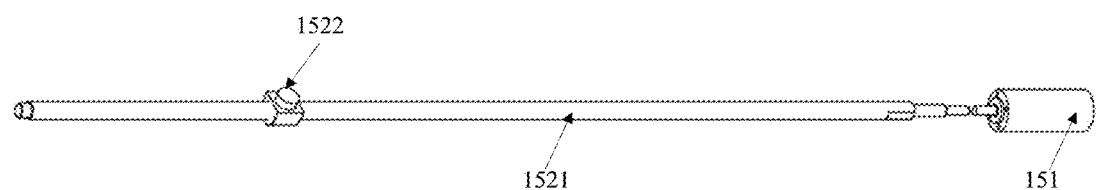
FIG. 10 illustrates a structure diagram of a drive device.
Figure 11:
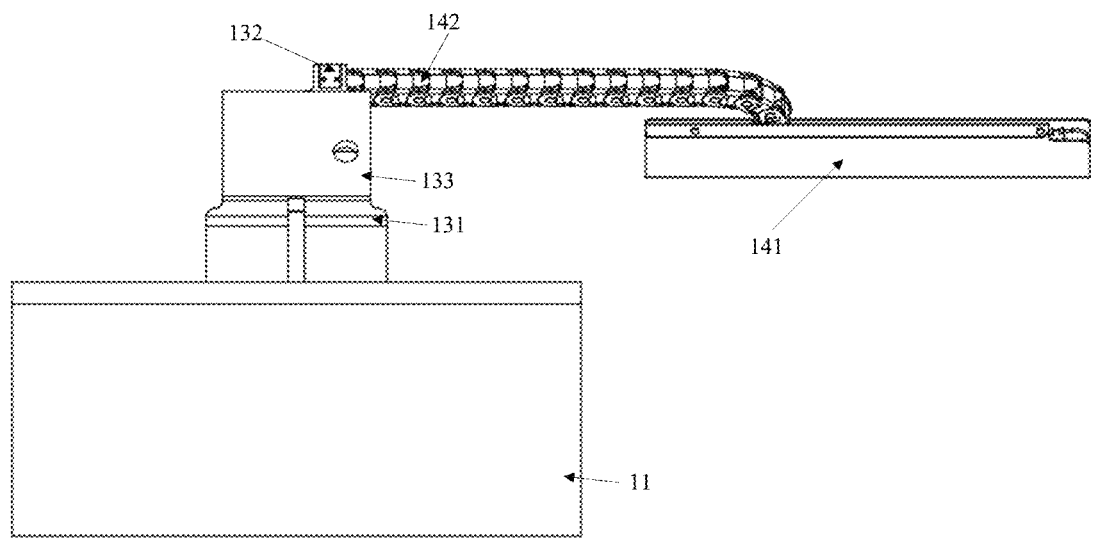
FIG. 11 illustrates a structure diagram of a slidable assembly.
Figure 12:
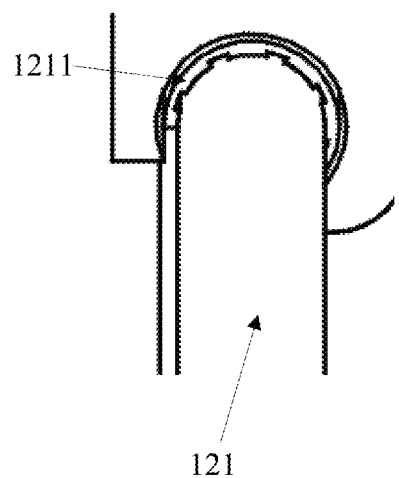
FIG. 12 illustrates a structure diagram of a bearing.

Referring to FIGS. 1-12, a main view of a first position of a device for concealing a steering wheel is illustrated in FIG. 1, a vertical view of a first position of a device for concealing a steering wheel is illustrated in FIG. 2, a schematic diagram of a first position of a connection of a chain is illustrated in FIG. 3, a main view of a second position of a device for concealing a steering wheel is illustrated in FIG. 4, a vertical view of a second position of a device for concealing a steering wheel is illustrated in FIG. 5, a schematic diagram of a second position of a connection of a chain is illustrated in FIG. 6, a perspective view of a second position of a steering wheel is illustrated in FIG. 7, a left view of a second position of a steering wheel is illustrated in FIG. 8, a structure diagram of a slide base is illustrated in FIG. 9, a structure diagram of a drive device is illustrated in FIG. 10, a structure diagram of a slidable assembly is illustrated in FIG. 11, and a structure diagram of a bearing is illustrated in FIG. 12.

In this embodiment, a vehicle provided in the present invention realizes that a display 11 shields a steering wheel 10 of the vehicle by providing a device for concealing a steering wheel for the steering wheel 10. In detail, a center console (not shown in figures) is installed in a cab of the vehicle. The steering wheel 10 is retractablly installed in the center console of the vehicle. As can be appreciated, the device should be disposed on a side of the steering wheel 10 facing drivers and keep a certain distance from the steering wheel 10 when the display 11 shielding the steering wheel 10, so as to ensure an extension-and-retraction space of the steering wheel 10. The steering wheel 10 can be out of the center console or embedded in the center console through adjustment of drivers. For example, when the vehicle is in autonomous driving, current operating frequency of the steering wheel 10 is significantly reduced. At this time, drivers may control the steering wheel 10 to be embedded in the center console according to the current operating frequency. When the vehicle is in a normal driving mode, the current operating frequency of the steering wheel 10 will be significantly increased, and at this time, drivers can control the steering wheel 10 to be out of the center console according to the current operating frequency.

In some embodiments, the steering wheel 10 may be out of or embedded in the center console through adjustment by drivers when the vehicle being in a non-driving mode. For example, when the vehicle is in the non-driving mode, the steering wheel 10 may be embedded in the center console, so that a temporary storage space of the cab is larger.

The following will introduce specific characteristics of the device to explain how the device can achieve that the display 11 shields the steering wheel 10 embedded in the center console.

In this embodiment, the device includes a slide mechanism, and the display 11. The steering wheel 10 is located between the slide mechanism and the center console. The steering wheel 10 is close to an end of the slide mechanism. The slide mechanism is installed in a length direction of the center console. The display 11 is fixed to the slide mechanism and is moved by the slide mechanism. In detail, the slide mechanism includes a slide base, and a slidable assembly. The slide base is fitted to the slide mechanism. The slide base includes a slide rail 121, and a base 122 for installing the slide rail 121. The base 122 is a base of the device and is installed in the center console, so that the device and the center console can form a space for installing the steering wheel 10. The slidable assembly is mounted to the slide rail 121. Specifically, the slidable assembly is slidably installed on the slide rail 121 so that the slidable assembly can move reciprocally along the slide base. The display 11 is fixed to the slidable assembly. The display is switched between a first position and a second position. The display 11 is separated from the steering wheel 10 when the display 11 being located at the first position. The display 11 shields a side of the steering wheel 10 away from the center console when the display 11 being located at the second position.

Furthermore, the first position is a middle position of the center console, and the second position may be an end of the device away from the steering wheel 10, so as to achieve switching a condition of the display 11 shielding to the steering wheel 10 when the display 11 is switched between the first position and the second position.

As can be appreciated, when the steering wheel 10 is embedded in the center console, the steering wheel 10 needs to be shielded. At this time, the display 11 is driven to move to the second position by the sildable assembly. For the steering wheel 10, the side of the steering wheel 10 away from the center console is the side that drivers contact in the normal driving mode. When the steering wheel 10 embedded in the center console is not shielded, although the steering wheel 10 is embedded in the center console, the space for the steering wheel 10 is difficult to be used, which causes waste of a space of the cab. At the same time, the steering wheel 10 embedded in the center console can still be seen by drivers, which affects aesthetics of the cab. After the steering wheel 10 embedded in the center console is shielded by the display 11, the space for the steering wheel 10 is temporarily replaced by the display 11, and users, especially drivers located at the cab, can use the display 11 to perform entertainment activities, while driving experience of drivers is improved, the steering wheel 10 embedded in the center console will not be visible to drivers, thereby realizing the aesthetics of the cab.

In this embodiment, the display 11 includes a display screen for displaying images. The display 11 is in a working state when the display 11 shielding the steering wheel 10 embedded in the center console. The display 11 may be some display devices having entertainment properties to improve the driving experience of drivers.

In some embodiments, the display 11 may be configured to display a current state of the vehicle, such as a current vehicle speed of the vehicle in driving modes, a current residual oil quantity or electricity quantity, residual sustainable driving time, accumulated driving time, and the like. In addition, control components may also be added to the display 11 on the basis of display pictures. For example, the control components may be a component capable of switching driving modes of the vehicle or a component capable of switching states of the steering wheel 10, and when the vehicle needs to switch the state, a corresponding operation is directly performed on the control components on the display 11, so that drivers further palm the driving modes of the vehicle or the state of the steering wheel 10.

The display 11 faces away from the steering wheel 10 when the display 11 shields the steering wheel 10 to enable drivers to perform entertainment activities by the display 11. As can be appreciated, in order for the display 11 to adequately occlude the steering wheel 10, a coverage surface of the display 11 should be large enough to allow the steering wheel 10 to be shielded. Meanwhile, in order to make the coverage surface of the display 11 as small as possible while satisfying the above conditions, the included angle formed between the display 11 and the steering wheel 10 should also be as small as possible. Exemplarily, in the present invention, the display 11 may be disposed in parallel with the steering wheel 10, so that the coverage surface of the display 11 required for shielding the steering wheel 10 is small enough, thereby reducing the cost of the display 11.

In this embodiment, the slidable assembly includes a first connecting portion 131, and a fitting portion 133. The fitting portion 133 is in a rectangular shape. The fitting portion 133 is slidably connected to the slide rail 121. In detail, the slide rail 121 is made of self-lubricating plastic, so as to reduce friction when the fitting portion 133 slides, thereby reducing abrasion of the slide rail 121. Specifically, the fitting portion 133 is fitted to the slide rail 121 through a bearing 1211. As shown in FIG. 12, an inner wall of the bearing 1211 is provided with a plurality of equidistant grooves, and the bearing 1211 is made of plastic. As can be appreciated, when the device moves the display 11 back and forth, dirt such as dust inevitably remains at a connection position between the fitting portion 133 of the device and the slide rail 121. According to the present invention, the plurality of equidistant grooves are provided on the inner wall of the bearing 1211, so that dust generated by the device during the process of the display 11 moving back and forth does not remain at the connection position between the fitting portion 133 of the device and the slide rail 121, and is taken out to be distributed on a surface of the device along with a movement of the display 11. Therefore, the bearing 1211 can reduce frequency of dismounting the fitting portion 133 from the slide rail 121 when cleaning the device, thereby simplifying a cleaning work of cleaning the device. Meanwhile, the present invention is additionally provided with the bearing 1211, which can also reduce the occurrence of situations such as wear and rusting at the connection portion between the fitting portion 133 and the slide rail 121 when the device works for a long time, so that efficiency of a reciprocating movement of the display 11 is reduced. By means of the bearing 1211, the present invention can increase a lubrication condition of the portion between the fitting portion 133 and the slide rail 121, so as to improve the efficiency of the reciprocating movement of the display 11.

As can be appreciated, the slide rail 121 can not only be made of self-lubricating plastic, but also can be rolling friction methods such as rollers, and can also achieve effects of reducing friction when the fitting portion 133 slides and reducing wear of the slide rail 121. Meanwhile, the slide rail 121 may also be sliding friction manners such as oil bearings and copper sleeves. In addition, according to different use scenarios, cross sections of the slide rail 121 may also be different shapes, such as a square cross section, a V-shaped cross section, and the like.

In the embodiment, two parallel slides are disposed on a side of the fitting portion 133 facing the slide base. Each slide is provided with a slidable rod (not shown in figures). In some embodiments, in order to guide a direction of the slidable assembly, a guide rod may be also added on the side of the fitting portion 133 facing the slide base, so as to guide the direction of the slidable assembly. One side of the first connecting portion 131 is connected to the fitting portion 133, and the other side of first connecting portion 131 is connected to the display 11. Furthermore, the slidable assembly further includes a second connecting portion 132. The second connecting portion 132 and the first connecting portion 131 are respectively located at two sides of the fitting portion 133. One side of the second connecting portion 132 is connected to the fitting portion 133.

In the embodiment, the device is further provided with a guide groove 141 for accommodating a cable (not shown in figures) of the display 11. The guide groove 141 is provided with a retractable chain 142, and the chain 142 is fixed to the other side of the second connecting portion 132. In detail, The cable of the display 11 can be wound around the chain 142 around the device, so that the cable can move along with extension-and-retraction of the chain 142, so that the cable can be out of or accommodated in the guide groove 141. Specifically, as shown in FIG. 3 and FIG. 6, when the display 11 is in the second position, the display 11 shields the steering wheel 10, and the chain 142 of the guide groove 141 is driven by the second connecting portion 132 to protrude into the guide groove 141 towards the second position. The cable is driven by the chain 142 to retract into the guide groove 141, so that the cable is accommodated in the guide groove 141. When the display 11 is in the first position, the display 11 is separated from the steering wheel 10, and at this time, the chain 142 of the guide groove 141 is driven by the second connecting portion 132 to retract into the guide groove 141 at the first position. The cable is out of the guide groove 141 along with the chain 142 without being exposed to the device.

Furthermore, since the first connecting portion 131, the fitting portion 133, and the second connecting portion 132 have a connection relationship and detaching frequency in the device is low, the first connecting portion 131, the fitting portion 133, and the second connecting portion 132 integrally form the slidable assembly, so as to reduce parts required for connection between the first connecting portion 131, the fitting portion 133, and the second connecting portion 132, thereby reducing the cost of the device.

In the embodiment, the device is further provided with a drive device to drive the slidable assembly to move. The drive device includes a motor 151, and a screw assembly. In detail, the motor 151 is provided at an end of the device away from the steering wheel 10, and the screw assembly can penetrate through the fitting portion 133 of the slidable assembly and is fixed to the fitting portion 133, so as to drive the slidable assembly to move. Specifically, the screw assembly includes a screw 1521, and a screw-nut 1522. The slide base forms an accommodating space between the two parallel slides. The screw-nut 1522 is mounted on the slide base and located in the accommodating space. The screw-nut 1522 is sleeved on the screw 1521 in a threaded connection with the screw 1521 so that the screw 1521 passes through and is fixed to the fitting portion 133. When the display 11 needs to occlude the steering wheel 10 or be separated from the steering wheel 10, the motor 151 drives a rotation of the screw 1521 to cooperate with the screw-nut 1522 to drive the slidable assembly to slide.

In some feasible embodiments, transmission modes may be a contact transmission mode such as a rope, a belt, and a gear rack, so as to drive the slidable assembly by the drive device, The transmission modes may also be a non-contact transmission mode such as a linear motor, so as to reduce the contact surface of the drive device when the drive device drives the slidable assembly to move, to reduce the wear of the drive device when the slidable assembly moves.

In above embodiments, specific characteristics of the device are introduced. The specific steps of controlling the device to occlude the steering wheel 10 and separating the steering wheel 10 will be specifically described below according to the specific characteristics of the device.

When the steering wheel 10 needs to be shielded, the steering wheel 10 is first controlled to be embedded in the center console, and when the steering wheel 10 is embedded in the center console, the motor 151 in the drive device is controlled to start to drive the screw 1521 to rotate. When the screw 1521 rotates, the screw 1521 cooperates with the screw-nut 1522 to drive the fitting to move, thereby realizing the sliding of the slidable assembly. The display 11 can move between the first position and the second position, and since the fitting portion 133 is connected to the first connecting portion 131, the display 11 connected to the first connecting portion 131 in the slidable assembly will also move towards the second position as the slidable assembly slides. During the movement of the display 11 to the second position, the cable of the display 11 will also be driven to move along with the movement of the display 11, In this case, the chain 142 provided in the guide groove 141 and connected to the second connecting portion 132 can be driven to be out of the guide groove 141 by the movement of the display 11 to the second position, The cable wound around the chain 142 will be driven to retract into the guide groove 141, preventing the device from causing a fault such as a cable jam when the display 11 moves. When the display 11 moves to the second position, the display 11 blocks the steering wheel 10 embedded in the center console, and at this time, the motor 151 is controlled to stop starting to stop the sliding of the slidable assembly, so that the display 11 also stops moving.

When the steering wheel 10 does not need to be shielded, the display 11 should be moved from the second position to the first position such that the display 11 is separated from the steering wheel 10 in the first position. In this case, the motor 151 in the driving device is controlled to start again, so as to drive the screw 1521 to rotate. When the screw 1521 rotates, the screw 1521 cooperates with the screw-nut 1522 to drive the fitting portion 133 to move, thereby implementing that the slidable assembly slides. Since the fitting portion 133 is connected to the first connecting portion 131, the display 11 connected to the first connecting portion 131 in the slidable assembly will also move as the slidable assembly slides. In the process of moving the display 11 from the second position to the first position, the cable of the display 11 will also move along with the movement of the display 11, and at this time, the chain 142 disposed in the guide groove 141 and connected to the second connecting portion 132 can be driven to protrude out of the guide groove 141 by the movement of the display 11 to the first position, and the cable wound around the chain 142 will be driven to protrude out of the guide groove 141 without being exposed to the device. When the display 11 moves to the first position, the display 11 is separated from the steering wheel 10, and finally the steering wheel 10 protrudes from the center console, so as to restore the state of the steering wheel 10 in the normal driving mode.

In the embodiment, in a process in which the display 11 shields the steering wheel 10 or the display 11 is separated from the steering wheel 10, the steering wheel 10 can be controlled to move first, then the display 11 is controlled to move, and the steering wheel 10 and the display 11 can also be controlled to move simultaneously. Specifically, when the steering wheel 10 needs to be shielded, the steering wheel 10 is embedded in the center console, and at the same time, the motor 151 in the drive device may also be controlled to start, thereby moving the display 11 towards the second position. Time required for embedding the steering wheel 10 in the center console may be less than time required for the display 11 to move to the second position, or a speed for embedding the steering wheel 10 in the center console may be greater than a speed for moving the display 11 to the second position, so that the steering wheel 10 and the display 11 do not collide during a simultaneous movement and damage to the display 11 or parts of the steering wheel 10.

By the same reasoning, when the steering wheel 10 does not need to be shielded, the steering wheel 10 protrudes from the center console, and at the same time, the motor 151 in the drive device may also be controlled to start, thereby moving the display 11 towards the first position. Time required for the steering wheel 10 to bulge out of the center console may be less than time required for the display 11 to move to the first position, or a speed for the steering wheel 10 to bulge out of the center console may be greater than a speed for the display 11 to move to the first position, so that the steering wheel 10 and the display 11 do not collide during the simultaneous movement and damage to the display 11 or parts of the steering wheel 10.

In above embodiments, the specific steps of controlling the device to occlude the steering wheel 10 and separating the steering wheel 10 are introduced. In order to protect components of the display 11 and device during the movement of the display 11, clash-proof blocks 16 can also be added to ends of the device near the steering wheel 10 and away from the steering wheel 10 (the clash-proof block away from the steering wheel being not shown in figures) to prevent colliding between the display 11 and the device and damaging to the display 11 or parts of the steering wheel 10.

In some embodiments, the device is further provided with a locking assembly (not shown in figures) to enable the display 11 to be fixed when switching between the first position and the second position, thus stopping the movement of the display 11. In detail, the locking assembly is connected to the device and the display 11, and is configured to lock the display 11 to the center console to stop the movement of the display 11 when the display 11 is in the first position and the second position. Understandably, the locking assembly can also not be connected to the display 11, but can be set directly in the drive device to control the movement and stop of the display 11 by braking the drive device. For example, the locking assembly can be arranged on the screw 1521, and the locking assembly can be a clip structure to match the display 11 moving to the first position and the second position. The locking assembly locks the screw 1521 so that the screw 1521 stops rotating, thereby stopping the movement of the display 11.

In other embodiments, when the locking assembly is not connected to the display 11, the locking assembly can also take other forms to stop the movement of the display 11. For example, spring steel posts (not shown in figures) may be provided at the first position and the second position, respectively. When the display 11 moves to the first position and the second position, the spring steel post slows down the movement of the screw 1521, thereby stopping the movement of the display 11. The screw 1521 can also be provided with a pin hole (not shown in figures), and a clamp structure at the first position and the second position (not shown in figures) to match the pin hole to form the locking assembly, thereby limiting the movement of the display 11 at the first position and the second position. In addition, the device can also be provided with electromagnetic brakes (not shown in figures). In detail, the electromagnetic brake is arranged in the first position and the second position respectively, and the corresponding electromagnetic brake is arranged in the fitting portion 133. When the display 11 moves to the the first position and the second position, the electromagnetic brake will slow down the movement of the display 11, thereby stopping the movement of the display 11.

In above embodiments, by means of the display and the slide mechanism provided in the central console of the vehicle, the display shields the steering wheel, so that the space of the steering wheel is reasonably utilized, thereby realizing expansion of the entertainment space for the driver, and aesthetics of the cab of the vehicle.

It should be noted that the embodiments number of this disclosure above is for description only and do not represent the advantages or disadvantages of embodiments. And in this disclosure, the term "including", "include" or any other variants is intended to cover a non-exclusive contain. So that the process, the devices, the items, or the methods includes a series of elements not only include those elements, but also include other elements not clearly listed, or also include the inherent elements of this process, devices, items, or methods. In the absence of further limitations, the elements limited by the sentence "including a . . . " do not preclude the existence of other similar elements in the process, devices, items, or methods that include the elements.

The above disclosed preferred embodiments of the invention are intended only to assist in the elaboration of the invention. The preferred embodiment does not elaborate on all the details and does not limit the invention to a specific embodiment. Obviously, according to the contents of this instruction manual, a lot of amendments and changes can be made. These embodiments are selected and described in detail in this specification for the purpose of better explaining the principle and practical application of the invention, so that the technical personnel in the technical field can better understand and utilize the invention. The invention is limited only by the claims and their full scope and equivalents.

The above are only the preferred embodiments of this disclosure and do not therefore limit the patent scope of this disclosure. And equivalent structure or equivalent process transformation made by the specification and the drawings of this disclosure, either directly or indirectly applied in other related technical fields, shall be similarly included in the patent protection scope of this disclosure.

The invention claimed is:

1. A device for concealing a steering wheel, wherein the steering wheel retractably installed in a center console of a vehicle to be out of the center console or embedded in the center console, the device for concealing the steering wheel comprising:
   a slide mechanism, installed in the center console; and
   a display, fixed to the slide mechanism, the display driven by the slide mechanism to be switched between a first position and a second position, the display being separated from the steering wheel when the display is located at the first position, the display covering the steering wheel when the display is located at the second position, such that the display has taken the place of the steering wheel's position in a visual field.

2. The device according to claim 1, wherein the first position is a middle position of the center console.

3. The device according to claim 1, wherein the display comprises a display screen for displaying images, and the display faces away from the steering wheel when the display shields the steering wheel, the display covers the whole steering wheel, a size of the display is lager than that of the whole steering wheel, a center of the display is align with that of the steering wheel.

4. The device according to claim 1, wherein the steering wheel is located between the slide mechanism and the center console, the steering wheel is close to an end of the slide mechanism, the slide mechanism comprises: a slide base, and a slidable assembly, the slidable assembly moves reciprocally along the slide base, the slide base comprises a slide rail, and a base for installing the slide rail, and the slidable assembly is slidably installed on the slide rail.

5. The device according to claim 4, wherein the slidable assembly comprises a first connecting portion and a fitting portion, the first connecting portion is connected to the display, and the fitting portion is slidably connected to the slide rail.

6. The device according to claim 5, wherein the slidable assembly further comprises a second connecting portion, the second connecting portion and the first connecting portion are respectively located at two sides of the fitting portion, the device for concealing the steering wheel is further provided with a guide groove for accommodating a cable of the display, the guide groove is provided with a retractable chain, and the chain is fixed to the second connecting portion.

7. The device according to claim 6, wherein the first connecting portion, the fitting portion, and the second connecting portion integrally form the slidable assembly.

8. The device according to claim 5, wherein the fitting portion is in a rectangular shape, two parallel slides are disposed on a side of the fitting portion facing the slide base, and each slide is provided with a slidable rod.

9. The device according to claim 8, wherein the device for concealing the steering wheel is further provided with a drive device, the drive device comprises a motor, and a screw assembly, the screw assembly comprises a screw, and a screw-nut, the slide base forms an accommodating space between the two parallel slides.

10. The device according to claim 9, wherein the screw-nut is mounted on the slide base and located in the accommodating space, the screw-nut is sleeved on the screw in a threaded connection with the screw, and the motor drives a rotation of the screw to cooperate with the screw-nut to drive the slidable assembly to slide.

11. A vehicle, wherein the vehicle comprising: a center console, a steering wheel, and a device for concealing the steering wheel, the steering wheel retractably installed in the center console of the vehicle to be out of the center console or embedded in the center console, the device for concealing the steering wheel comprising:
   a slide mechanism, installed in a length direction of the center console, the steering wheel being located between the slide mechanism and the center console, the steering wheel being close to an end of the slide mechanism, the slide mechanism comprising: a slide base, and a slidable assembly, the slidable assembly moving reciprocally along the slide base; and
   a display, fixed to the slide mechanism, the display driven by the slide mechanism to be switched between a first position and a second position, the display being separated from the steering wheel when the display is located at the first position, the display covering the steering wheel when the display is located at the second position, such that the display has taken the place of the steering wheel's position in a visual field.

12. The vehicle according to claim 11, wherein the first position is a middle position of the center console.

13. The vehicle according to claim 11, wherein the display comprises a display screen for displaying images, and the display faces away from the steering wheel when the display shields the steering wheel, the display covers the whole steering wheel, a size of the display is lager than that of the whole steering wheel, a center of the display is align with that of the steering wheel.

14. The vehicle according to claim 11, wherein the steering wheel is located between the slide mechanism and the center console, the steering wheel is close to an end of the slide mechanism, the slide mechanism comprises: a slide base, and a slidable assembly, the slidable assembly moves reciprocally along the slide base, the slide base comprises a slide rail, and a base for installing the slide rail, and the slidable assembly is slidably installed on the slide rail.

15. The vehicle according to claim 14, wherein the slidable assembly comprises a first connecting portion and a fitting portion, the first connecting portion is connected to the display, and the fitting portion is slidably connected to the slide rail.

16. The vehicle according to claim 15, wherein the slidable assembly further comprises a second connecting portion, the second connecting portion and the first connecting portion are respectively located at two sides of the fitting portion, the device for concealing the steering wheel is further provided with a guide groove for accommodating a cable of the display, the guide groove is provided with a retractable chain, and the chain is fixed to the second connecting portion.

17. The vehicle according to claim 16, wherein the first connecting portion, the fitting portion, and the second connecting portion integrally form the slidable assembly.

18. The vehicle according to claim 15, wherein the fitting portion is in a rectangular shape, two parallel slides are disposed on a side of the fitting portion facing the slide base, and each slide is provided with a slidable rod.

19. The vehicle according to claim 18, wherein the device for concealing the steering wheel is further provided with a drive device, the drive device comprises a motor, and a screw assembly, the screw assembly comprises a screw, and a screw-nut, the slide base forms an accommodating space between the two parallel slides.

20. The vehicle according to claim 19, wherein the screw-nut is mounted on the slide base and located in the accommodating space, the screw-nut is sleeved on the screw in a threaded connection with the screw, and the motor drives a rotation of the screw to cooperate with the screw-nut to drive the slidable assembly to slide.

* * * * *